(12) United States Patent
Nazuka et al.

(10) Patent No.: US 10,587,841 B1
(45) Date of Patent: Mar. 10, 2020

(54) VIDEO TRANSMISSION SYSTEM

(71) Applicants: TOPPAN PRINTING CO., LTD., Tokyo (JP); THE UNIVERSITY OF TOKYO, Tokyo (JP)

(72) Inventors: Ichiro Nazuka, Tokyo (JP); Takashi Ogino, Tokyo (JP); Junichi Rekimoto, Tokyo (JP); Takashi Miyaki, Tokyo (JP)

(73) Assignees: TOPPAN PRINTING CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 16/569,304

(22) Filed: Sep. 12, 2019

(30) Foreign Application Priority Data

Sep. 13, 2018 (JP) ................ 2018-171410

(51) Int. Cl.
*H04N 7/14* (2006.01)
*H04N 7/15* (2006.01)
*H04N 5/765* (2006.01)

(52) U.S. Cl.
CPC ............. *H04N 7/147* (2013.01); *H04N 5/765* (2013.01); *H04N 7/15* (2013.01)

(58) Field of Classification Search
CPC ....................................................... H04N 7/14
See application file for complete search history.

(56) References Cited

U.S. PATENT DOCUMENTS 8,970,663 B2 * 3/2015 Gagneraud ............ H04N 5/232
 348/14.16
2019/0306461 A1 * 10/2019 Liu ........................ H04N 7/144

FOREIGN PATENT DOCUMENTS

JP 2010-074456 A 4/2010

* cited by examiner

*Primary Examiner* — Olisa Anwah
(74) *Attorney, Agent, or Firm* — Squire Patton Boggs (US) LLP

(57) ABSTRACT

In a video transmission system, a video transmission device includes circuitry configured to determine an attention position where a viewer located in a second space is estimated to pay attention to a situation in a first space, divide a range included in a recorded video of the first space into multiple regions including at least a first region having the attention position and a second region, set a first video quality for the first region and set a second video quality lower than the first video quality for the second region, generate video data in accordance with the first video quality and the second video quality, and transmit the video data to a video output device. The video output device includes circuitry configured to control a display unit using the video data such that the display unit displays a video showing the situation in the first space.

9 Claims, 8 Drawing Sheets

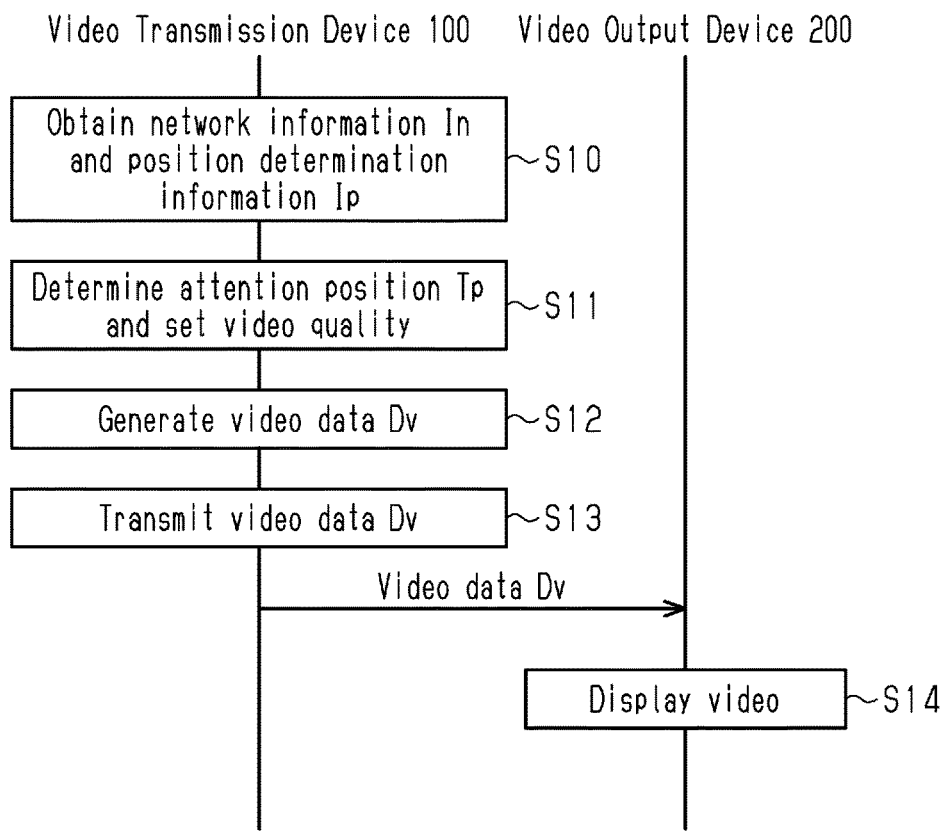
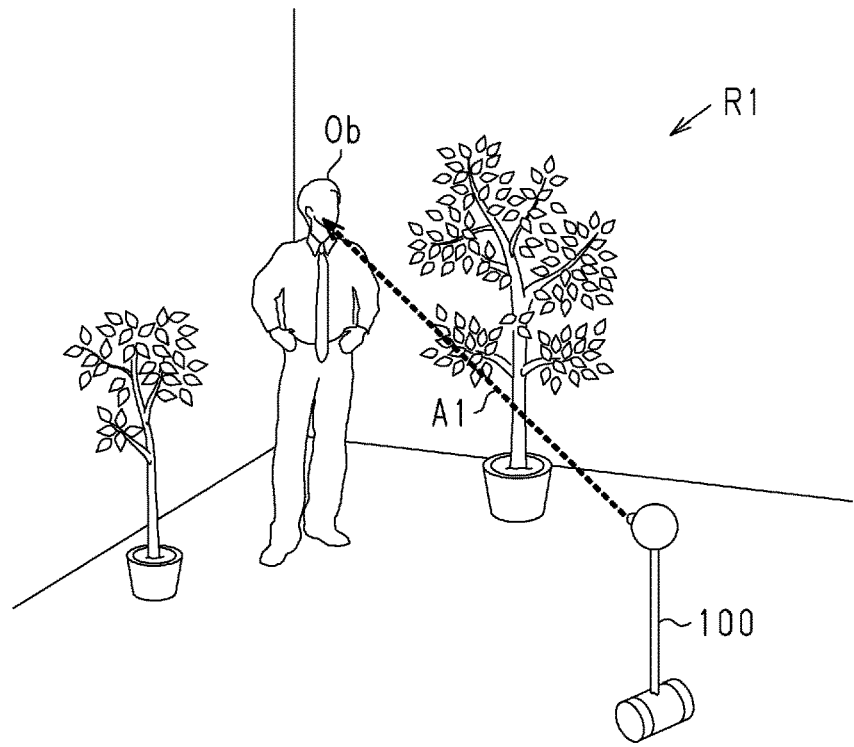

VIDEO TRANSMISSION SYSTEM

BACKGROUND

1. Field

The following description relates to a video transmission system that transmits a video to a remote place.

2. Description of Related Art

Japanese Laid-Open Patent Publication No. 2010-74456 describes a system used for, for example, a remote meeting. In this system, a video showing a situation in a first space is displayed on a display device arranged in a second space, which is distant from the first space. The video data is transmitted via a network such as the Internet. A viewer located in the second space is capable of obtaining information related to the situation of the first space by viewing the video that appears on the display device. For example, the viewer is capable of communicating with a person located in the first space.

The display device in the second space displays the situation of the first space over a wide range by video. This allows the viewer to feel as if he or she is actually located in the first place and to feel more realistic. However, a video showing a situation over a wide range increases the communication load as the volume of data increases, thereby lowering the video quality.

SUMMARY

It is an objective of the present disclosure to provide a video transmission system capable of making a viewer feel more realistic while limiting an increase in the communication load that occurs when video data is transmitted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a video transmission system is provided. The system includes a video transmission device including a video-recording unit configured to record a situation in a first space and a video output device including a display unit arranged in a second space. The video output device is connected to the video transmission device via a network. The display unit is configured to display a video of the first space. The video transmission device includes circuitry configured to determine an attention position where a viewer located in the second space is estimated to pay attention to the situation in the first space, divide a range included in a video recorded by the video-recording unit into multiple regions that include at least a first region and a second region, the first region including the attention position, set a first video quality for the first region and set a second video quality for the second region, the second video quality being lower than the first video quality, generate video data from recorded data of the video-recording unit in accordance with the first video quality and the second video quality, and transmit the video data to the video output device. The video output device includes circuitry configured to control the display unit using the video data received from the video transmission device such that the display unit displays the video showing the situation in the first space.

Other features and aspects will be apparent from the following detailed description, the drawings, and the claims.

BRIEF DESCRIPTION OF THE DRAWINGS

FIG. 3 is a sequence chart schematically illustrating a procedure for the video transmission system of the first embodiment.

FIG. 4 is a diagram showing an example of the position of a target to be detected in the video transmission system of the first embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A video transmission system according to a first embodiment will now be described with reference to FIGS. 1 to 6. Description will be made on a mode in which the video transmission system is used for remote communication such as a remote meeting.

Usage Environment of Video Transmission System

The video transmission system of the present embodiment transmits video data to a remote place via a network. First, the environment in which the video transmission system is used will be described.

Figure 1:
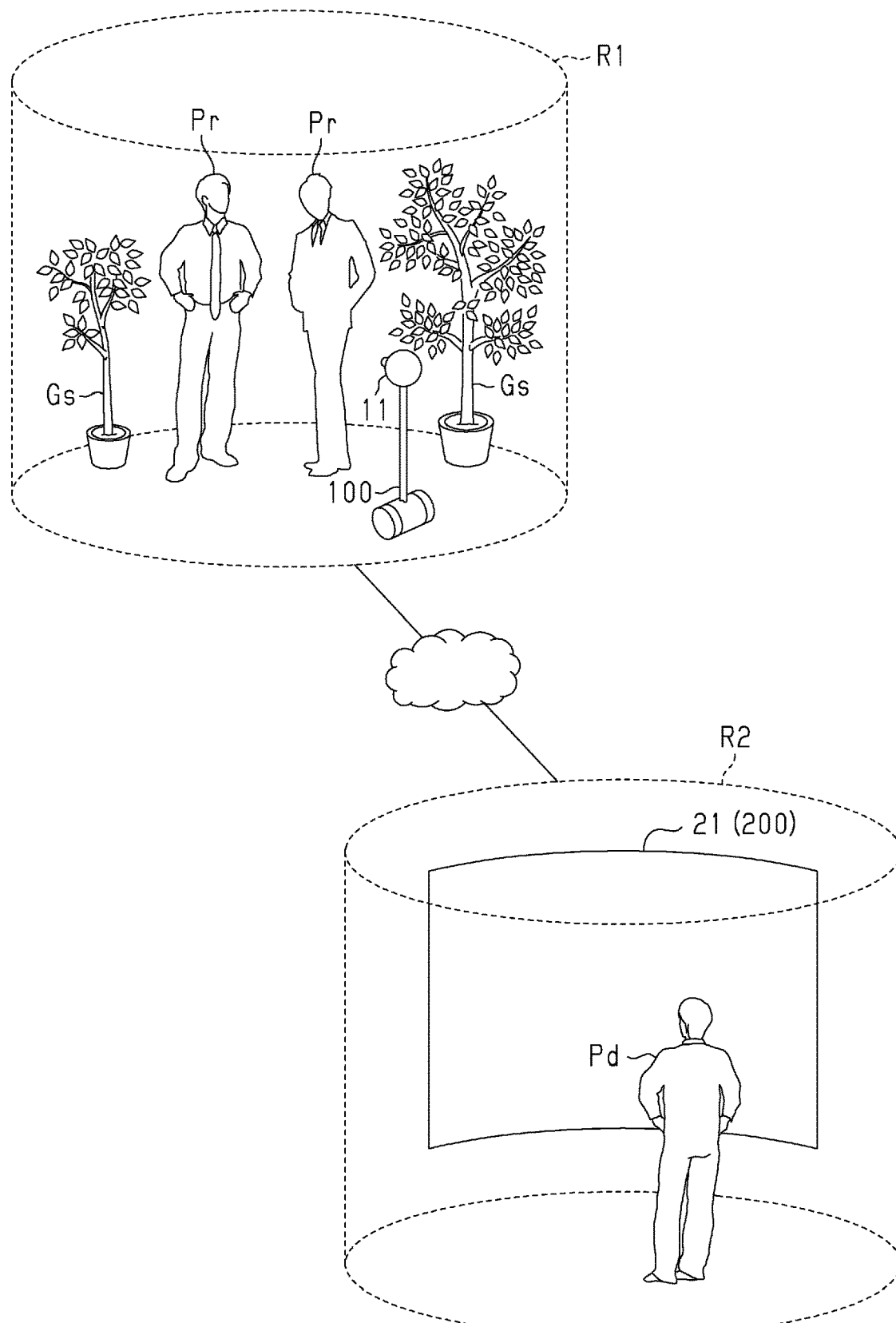
FIG. 1 is a diagram schematically showing an environment in which a video transmission system according to a first embodiment is used.

As shown in FIG. 1, the video transmission system of the present embodiment causes a video of a first space R1 to be displayed on a display unit 21 of a video output device 200, which is arranged in a second space R2. The first space R1 and the second space R2 are spaced apart from each other. For example, the first space R1 and the second space R2 are meeting rooms at different locations.

In the first space R1, a video transmission device 100, which has functions of recording and transmitting a video, is arranged. The video transmission device 100 includes a video-recording unit 11, which has a recording range including participants Pr of a meeting and articles Gs such as interior ornaments. In the second space R2, a single viewer Pd, who views the video displayed on the display unit 21, is located.

Configuration of Video Transmission System

Figure 2:
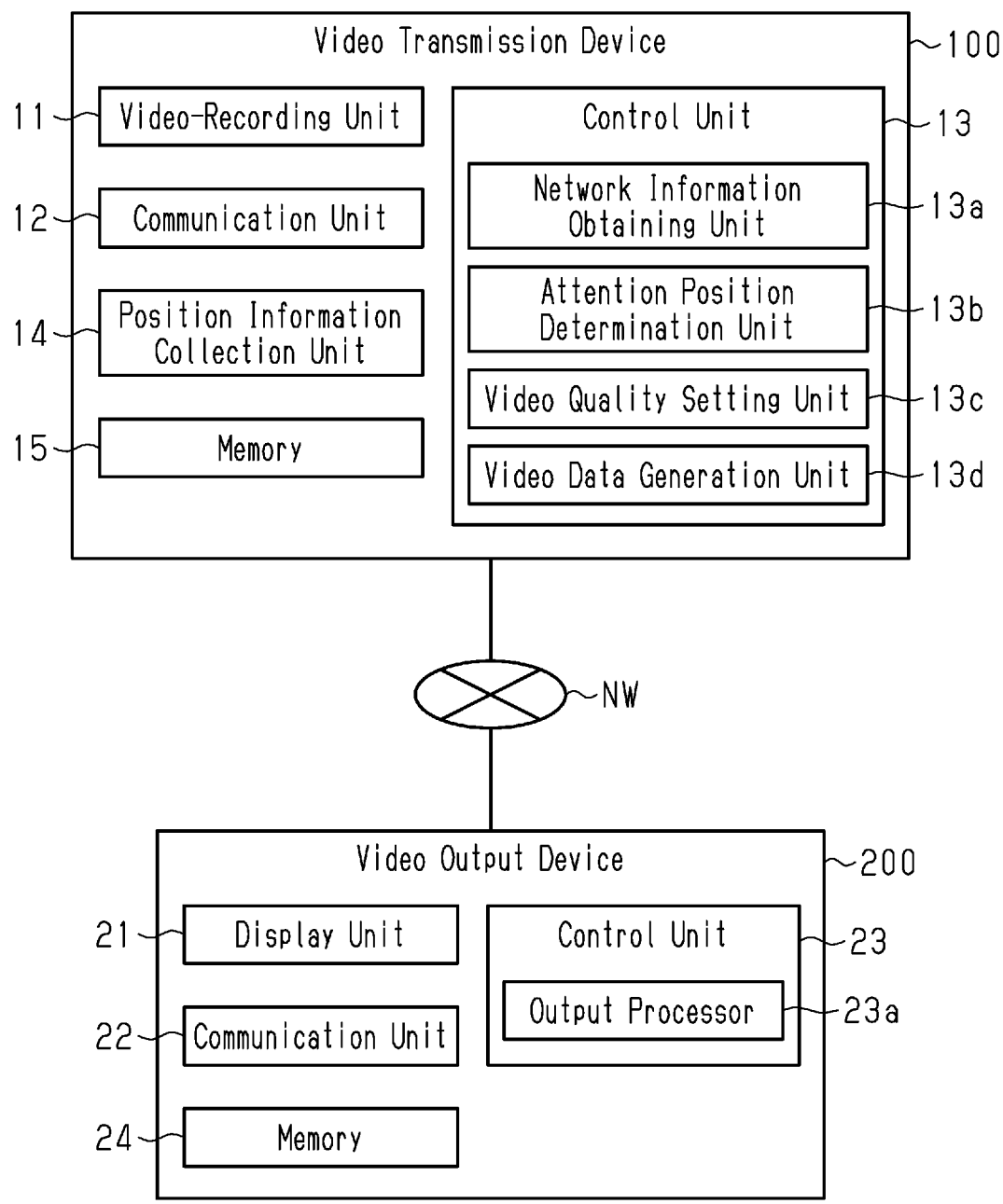
FIG. 2 is a diagram showing the configuration of a device provided in the video transmission system of the first embodiment.

The functional configuration of the video transmission system will now be described. As shown in FIG. 2, the video transmission system includes the above-described video transmission device 100, which is arranged in the first space R1, and the above-described video output device 200, which is arranged in the second space R2. The video transmission device 100 and the video output device 200 transmit and receive data to and from each other via a network NW. The network NW may be a versatile communication network including such as the Internet, a network using a wireless LAN such as Wi-Fi (registered trademark) or a wired LAN, or a network for mobile data communication. Alternatively, the network NW may be a closed network such an intranet.

The video transmission device 100 includes the video-recording unit 11, a communication unit 12, a control unit 13, a position information collection unit 14, and a memory 15. The elements of the video transmission device 100 may be integrally coupled to each other. Alternatively, at least part of the elements may be arranged separately from the other elements. The control unit 13 may be connected to the elements other than the control unit 13 in a wireless or wired manner. The video transmission device 100 is applied to, for example, a telepresence robot. The telepresence robot is configured such that its position and orientation is variable. As long as the video transmission device 100 can vary its orientation and has a recording function and a communication function, the video transmission device 100 is not limited to the telepresence robot.

The video-recording unit 11 has a movie-recording function and records a situation in the first space R1. The video-recording unit 11 includes one or more cameras. The camera of the video-recording unit 11 includes, for example, a camera having a standard angle of view, a camera having a wide-angle lens, and a camera capable of recording over a 360° range with the camera centered.

In order to make the viewer Pd feel more realistic, it is preferred that the recording range of the video-recording unit 11 in the horizontal direction be wider than the horizontal field of view of a human. More specifically, it is preferred that the video-recording unit 11 be capable of recording over a range having a central angle of 60° or larger from the front of the video-recording unit 11 to each of the left and right of the video-recording unit 11 with the video-recording unit 11 centered. Further, in order to make the viewer Pd feel more realistic, it is preferred that the recording range of the video-recording unit 11 in the vertical direction be wider than the vertical field of view of a human. More specifically, it is preferred that the video-recording unit 11 be capable of recording over a range having a central angle of 60° or larger from the front of the video-recording unit 11 to each of the top and bottom of the video-recording unit 11 with the video-recording unit 11 centered. That is, the recording range of the video-recording unit 11 is a range included in a video recorded by the video-recording unit 11.

The communication unit 12 executes a connection process for connecting the video transmission device 100 and the video output device 200 to each other to transmit and receive data to and from these devices. That is, the communication unit 12 is a transmission interface and a reception interface.

The control unit 13 has a configuration including a CPU and a volatile memory such as a RAM. Based on the programs and data stored in the memory 15, the control unit 13 performs the control of each unit of the video transmission device 100 such as the control of processes executed by the video-recording unit 11, the communication unit 12, and the position information collection unit 14, reading and writing of information in the memory 15, and various calculation processes. The control unit 13 includes, as functional units configuring the video transmission system, a network information obtaining unit 13a, an attention position determination unit 13b, a video quality setting unit 13c, and a video data generation unit 13d.

The network information obtaining unit 13a obtains network information In via the communication unit 12. The network information In indicates a communication status between the video transmission device 100 and the video output device 200 using the network NW. In other words, the network information In is used to determine how much data is needed for smooth transmission via the network NW. The network information In includes, for example, a communication speed, a data band, a bandwidth, and latency. In the first embodiment, the network information In is information of at least one line included in an upward communication channel from the video transmission device 100 to the video output device 200 as viewed from the video transmission device 100.

The attention position determination unit 13b determines an attention position Tp in the first space R1 based on the information collected by the position information collection unit 14. The attention position Tp is included in a recording range of the video-recording unit 11. The attention position Tp is a position at which the viewer Pd is estimated to pay attention to a situation in the first space R1. In other words, the attention position Tp is a position to which the viewer Pd is estimated to pay attention in the video displayed on the video output device 200.

Based on the information including the network information In and the attention position Tp, the video quality setting unit 13c divides a video range So, which is a range included in the video recorded by the video-recording unit 11, into multiple regions and determines the video quality of each region. The video quality setting unit 13c outputs video quality information Iv, which indicates the video quality of each region. More specifically, the video quality setting unit 13c sets the video quality of each region such that any region not including the attention position Tp has a lower video quality than a region including the attention position Tp.

The video data generation unit 13d generates video data Dv from recorded data Dr, which is generated when the video-recording unit 11 records a video, in accordance with the video quality set by the video quality setting unit 13c (i.e., video quality information Iv). The video data generation unit 13*d* transmits the video data Dv to the video output device 200 via the communication unit 12.

The position information collection unit 14 collects position determination information Ip, which is used to determine the attention position Tp. For example, the position determination information Ip contributes to identifying the position of an object Ob, which is located in the first space R1, relative to the video transmission device 100. When the position determination information Ip is information that contributes to identifying the relative position, the position information collection unit 14 includes, for example, an infrared ray laser device and its photoreceptor, a millimeter wave radar device, an image-capturing device such as a camera, and a device for receiving voice. The position information collection unit 14 sends the outputs from these devices to the control unit 13 as the position determination information Ip.

The memory 15 has a configuration including a non-volatile memory and stores the programs and data that are needed for the processes executed by the control unit 13. The functions of the network information obtaining unit 13*a*, the attention position determination unit 13*b*, the video quality setting unit 13*c*, and the video data generation unit 13*d* of the control unit 13 may be separately achieved by various types of hardware such as multiple CPUs and a memory including a RAM and by software that causes them to function. Alternatively, the functions may be achieved by software that gives multiple functions to a common single piece of hardware. Such software is stored in the memory 15 as a video transmission program.

The video output device 200 includes the display unit 21, a communication unit 22, a control unit 23, and a memory 24. The elements of the video output device 200 may be integrally coupled to each other. Alternatively, at least part of the elements may be arranged separately from the other elements. The control unit 23 may be connected to the elements other than the control unit 23 in a wireless or wired manner.

The display unit 21 has a function of displaying a video. For example, the display unit 21 is a display using liquid crystal, organic EL, LED, or the like. Alternatively, the display unit 21 is a device including a screen and a projector and displaying a video through projection. The shape of a display region in the display unit 21, that is, the shape of a display or a screen is not particularly limited. For example, the display unit 21 has a flat shape such as a rectangular shape, a tubular or polygonal tubular shape that surrounds the viewer Pd, or a cubic shape that surrounds the top, bottom, left, right, front, and back of the viewer Pd. In this manner, the display unit 21 may be arranged not only in front of the viewer Pd but also beside and behind the viewer Pd or above and below the viewer Pd (i.e., at the ceiling and floor of the second space R2). In order to make the viewer Pd feel more realistic, it is preferred that the display region of the display unit 21 have a shape that surrounds the viewer Pd.

To make the viewer Pd feel more realistic, in the same manner as the recording range of the video-recording unit 11, it is preferred that the display region have a central angle of 60° or larger from the front of a scheduled viewing position of the viewer Pd to each of the left and right with the position centered. To make the viewer Pd feel more realistic, it is preferred that the display region have a central angle of 60° or larger from the front of the scheduled viewing position of the viewer Pd to each of the top and bottom with the position centered. The scheduled viewing position is set in advance as a position where the head of the viewer Pd is arranged when the viewer Pd having a standard height views the display unit 21.

The communication unit 22 executes a connection process for the video output device 200 and the video transmission device 100 to transmit and receive data to and from these devices. That is, the communication unit 22 is a transmission interface and a reception interface.

The control unit 23 has a configuration including a CPU and a volatile memory such as a RAM. Based on the programs and data stored in the memory 24, the control unit 23 performs the control of each unit of the video output device 200 such as control of processes executed by the display unit 21 and the communication unit 22, reading and writing of information in the memory 24, and various calculation processes. The control unit 23 includes an output processor 23*a* as a functional unit configuring the video transmission system.

The output processor 23*a* adds necessary conversion to the video data Dv, which is received by the communication unit 22 from the video transmission device 100, in conformance with the shape of the display region or the like and causes the display unit 21 to display the video based on the video data Dv.

The memory 24 has a configuration including a non-volatile memory and stores the programs and data that are needed for the processes executed by the control unit 23. The function of the output processor 23*a* of the control unit 23 may be achieved by various types of hardware such as multiple CPUs and a memory including a RAM and by software that causes them to function. Alternatively, the functions may be achieved by software that gives multiple functions to a single piece of hardware. Such software is stored in the memory 24.

Operation of Video Transmission System

The overview of a procedure for the video transmission system will now be described with reference to FIG. 3. When the video-recording unit 11 of the video transmission device 100 starts recording a video of the first space R1, the control unit 13 successively receives the recorded data Dr generated through the video-recording. The processes shown in FIG. 3 are performed during a period in which the video-recording unit 11 is recording a video.

First, the control unit 13 of the video transmission device 100 obtains the position determination information Ip, which is collected by the position information collection unit 14, and the network information In (step S10).

Next, the control unit 13 determines the attention position Tp, divides the video range So into multiple regions, and sets the video quality of each region (step S11).

Then, the control unit 13 converts the recorded data Dr into the video data Dv in accordance with the video quality information Iv, which indicates the video quality set in step S1*l* (step S12).

When the video data Dv is generated, the control unit 13 transmits the video data Dv to the video output device 200 via the communication unit 12 (step S13).

When receiving the video data Dv, the control unit 23 of the video output device 200 causes the display unit 21 to display the video using the video data Dv (step S14).

In the processes shown in FIG. 3, the processes of step S10 and step S11 may be performed in a predetermined interval while the video-recording unit 11 is recording a video. Alternatively, the process of step S10 may be performed in the predetermined interval, and the process of step S11 may be performed only in a case in which either the network information In or the position determination information Ip has changed from the previous time in which it was obtained. In the process of step S12, using new video quality information Iv, the processes of step S12 to step S14 are successively performed for the recorded data Dr received by the control unit 13 such that a video showing a situation in the first space R1 is displayed on the video output device 200 of the second space R2.

Determination Process for Attention Position

The process for determining the attention position Tp performed by the attention position determination unit 13b of the control unit 13 of the video transmission device 100 will now be described in detail with reference to FIG. 4.

Based on the position determination information Ip collected by the position information collection unit 14, the attention position determination unit 13b determines the position of a target Ob, which is located in the first space R1, relative to the video transmission device 100 and sets the position as the attention position Tp. As shown by the arrow A1 in FIG. 4, the relative position is defined by a direction in which the target Ob is located relative to the video transmission device 100 and by a distance from the video transmission device 100 to the target Ob. The target Ob is a target to which the viewer Pd is estimated to pay attention. When the video transmission system is used for a remote meeting, the target Ob is, for example, a participant of the meeting. Further, the target Ob may be one of multiple participants who is speaking or may be part of a person such as the face of a participant. When the target Ob is moved or changed, the attention position Tp is moved or changed.

The position information collection unit 14 is configured to collect the information contributing to identifying the position of the target Ob as the position determination information Ip in accordance with the feature of the target Ob. For example, based on the position determination information Ip, the position information collection unit 14 detects motion or voice of a person or detects the face of the person with image analysis. Based on the detection, the position information collection unit 14 identifies the target Ob and obtains the position of the target Ob.

It is preferred that the orientation of the video transmission device 100 be taken into account to identify the target Ob. When the orientation of the video transmission device 100 is variable (for example, when the video transmission device 100 is a telepresence robot), the target Ob is identified based on the above-described detection of the motion, voice, or face of the person within a range of the front of the video transmission device 100 and the vicinity of the front.

The orientation of the video transmission device 100 may be remotely operated by the viewer Pd in the second space R2. For example, an operation unit arranged in the second space R2 is operated by the viewer Pd, and its operation information is transmitted from the video output device 200 to the video transmission device 100. The video transmission device 100 includes a drive unit having a motor or the like that changes the orientation of the video transmission device 100, and the control unit 13 causes the drive unit to change the orientation of the video transmission device 100 based on the operation information. Such a configuration allows the viewer Pd to control the range in which the attention position Tp is determined. That is, the intention of the viewer Pd is reflected on the determination of the attention position Tp. This allows for outputting of a video that satisfies the wish of the viewer Pd.

The orientation of the video transmission device 100 may be obtained by the attention position determination unit 13b based on, for example, the amount of rotation of the motor in the drive unit. Alternatively, the position information collection unit 14 may include a sensor or the like that detects the orientation of the video transmission device 100 and the output of such a sensor may be included in the position determination information Ip such that the attention position determination unit 13b obtains the orientation of the video transmission device 100 based on the position determination information Ip. The sensor is, for example, a gyro sensor, an acceleration sensor, or a geomagnetic sensor.

The position of the target Ob identified by the attention position determination unit 13b simply needs to be a position relative to a reference point in the first space R1. When the reference point is set to the position of one of the members configuring the video transmission device 100, the position of the target Ob is a position relative to the video transmission device 100. Further, the identified position of the target Ob may be an absolute position with reference to a three-dimensional orthogonal coordinate system set in the first space R1. In short, the identified position of the target Ob (i.e., attention position Tp) simply needs to be a position that is managed in correspondence with a position in a video (i.e., a position in the video range So). Additionally, the attention position Tp may be a point or may be a range having a two-dimensional or three-dimensional space.

The attention position Tp may be determined based only on the orientation of the video transmission device 100 instead of identifying the target Ob based on the above-described detection of the motion, voice, or face of the person. For example, the attention position Tp may be located in front of the video transmission device 100 and away from the video transmission device 100 by a predetermined distance. The orientation of the video transmission device 100 is the orientation of a predetermined part (for example, the video-recording unit 11) of the video transmission device 100. The part serving as a reference is set in advance.

In addition, for example, when the target Ob is fixed to a predetermined person, a device such as a sensor that detects the position of the target Ob may be attached to the target Ob. Such a device configures the position information collection unit 14.

Setting Process for Video Quality

The process for setting a video quality performed by the video quality setting unit 13c of the control unit 13 of the video transmission device 100 will now be described in detail.

Based on the position information of the attention position Tp, the video quality setting unit 13c identifies the attention position Tp in the video range So (i.e., recorded attention position Tp) and divides the video range So into multiple regions including a priority region Sp.

Description will be made on a mode in which the video range So is divided into three types of regions, namely, the priority region Sp (first region), a non-priority region Sn (second region), and a boundary region Sb. The priority region Sp includes the attention position Tp. The priority region Sp may have, for example, a predetermined size with the attention position Tp centered. Alternatively, when the attention position Tp is a range having a space, the priority region Sp may correspond to the attention position Tp. The boundary region Sb is located between the priority region Sp and the non-priority region Sn and is narrower than the priority region Sp and the non-priority region Sn. The non-priority region Sn is a region that excludes the boundary region Sb from the regions other than the priority region Sp. Movement or change of the attention position Tp moves or changes the priority region Sp, thereby moving or changing the regions other than the priority region Sp.

For example, the attention position Tp is used to set a scheduled priority region, which is scheduled to become the priority region Sp. Further, the regions other than the scheduled priority region are set as scheduled non-priority regions, which are scheduled to become the non-priority regions Sn. The portion including the boundary between the scheduled priority region and the scheduled non-priority region is set as the boundary region Sb, which has a predetermined size. The portion that excludes the boundary region Sb from the scheduled priority region is defined as the priority region Sp, and the portion that excludes the boundary region Sb from the scheduled non-priority region is defined as the non-priority region Sn.

When the display region of the display unit 21 of the video output device 200 is longer in the horizontal direction than in the vertical direction, it is preferred that the video range So be divided into the priority region Sp, the non-priority region Sn, and the boundary region Sb at least in the horizontal direction. When the video range So is divided into the regions Sp, Sn, and Sb only in the horizontal direction, the entire video range So in the vertical direction is included in one of the priority region Sp, the non-priority region Sn, or the boundary region Sb at each position of the video range So in the horizontal direction. Further, the video range So may be divided into the priority region Sp, the non-priority region Sn, and the boundary region Sb in the vertical direction.

Figure 5:
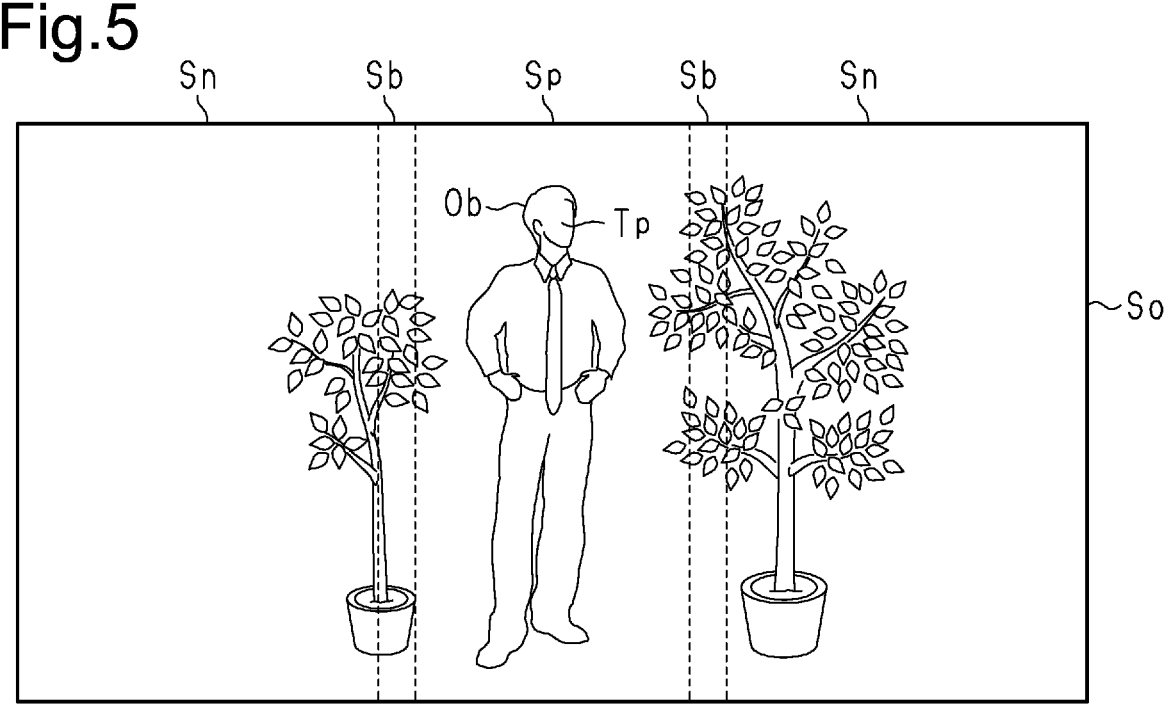
FIG. 5 is a diagram showing an example of how a video range is divided in the video transmission system of the first embodiment.

Although FIG. 5 illustrates the mode in which each of the priority region Sp, the non-priority regions Sn, and the boundary regions Sb is rectangular, the shape of each region is not particularly limited. For example, the shape of the priority region Sp may be circular or oval.

Subsequently, the video quality setting unit 13c sets the video qualities of the priority region Sp, the non-priority region Sn, and the boundary region Sb. The video quality of the priority region Sp (first video quality) is the highest, and the video quality of the non-priority region Sn (second video quality) is the lowest. That is, the video quality setting unit 13c determines the video quality of each of the priority region Sp, the boundary region Sb, and the non-priority region Sn such that the video quality decreases in the order of the regions Sp, Sb, and Sn.

The highest video quality means that at least one of the sharpness of an image included in a video or the smoothness of a motion in a video is high. The video quality is a feature that contributes to reducing the volume of the video data Dv. As the video quality decreases, the volume of the video data Dv decreases.

The parameters that define the video quality include, for example, a bit rate, a resolution, a codec, and a frame rate. The video quality setting unit 13c differentiates at least one of the parameters between the regions Sp, Sn, and Sb to produce difference between the regions Sp, Sn, and Sb in the video quality. Among the parameters, a bit rate can be set regardless of the specification of the display unit 21 or the video-recording unit 11. Thus, it is preferred that the video quality setting unit 13c differentiate bit rates to produce difference between the regions Sp, Sn, and Sb in the video quality. That is, when a predetermined frame rate is applied to each of the regions Sp, Sn, and Sb, the video quality setting unit 13c sets a bit rate per pixel such that the priority region Sp has the highest bit rate per pixel and the bit rate per pixel decreases in the order of the boundary region Sb and the non-priority region Sn. The bit rate per unit division in the priority region Sp is a first bit rate per unit division, and the bit rate per unit division in the non-priority region Sn is a second bit rate per unit division.

Alternatively, the video quality setting unit 13c may apply various filters for image processing to produce differences between the regions Sp, Sn, and Sb in the video quality. Such image filters include, for example, a filter that reduces the sharpness of an object in an image such as a filter that obscures an object through a luminance smoothing process. More specifically, the filter is a moving average filter or a Gaussian filter. For example, the video quality setting unit 13c sets the application of the filter to the non-priority region Sn and the boundary region Sb such that unit divisions for smoothing are larger in the non-priority region Sn than in the boundary region Sb.

As another option, the video quality setting unit 13c may combine the setting of the parameters that define the video quality such as the above-described bit rate with the application of the image filter to produce difference between the regions Sp, Sn, and Sb in the video quality. For example, when the bit rate of the non-priority region Sn is set to be smaller than that of the priority region Sp and the filter that obscures an object is applied to the boundary region Sb, the boundary between the adjacent regions is not easily recognized by the viewer Pd. Thus, the discomfort of the viewer Pd, which would result from the difference in the video quality, is reduced.

As an alternative, the video quality setting unit 13c may fix the non-priority region Sn to an image of a certain frame to become a still image, thereby setting a lower video quality for the non-priority region Sn than the other regions. When an object included in the non-priority region Sn is a static article such as an interior ornament, the discomfort of the viewer Pd is reduced even if the non-priority region Sn is a still image.

In short, the video quality simply needs to decrease in the order of the priority region Sp, the boundary region Sb, and the non-priority region Sn. Further, the volume of the video data Dv simply needs to be small as compared to when all the regions have the same video quality as the priority region Sp.

The video range So simply needs to be divided into at least two types of regions including the priority region Sp and the non-priority region Sn. The types of regions having different video qualities are not limited to three and may be two or may be four or more. When the video range So is divided into the two types of regions, namely, the priority region Sp and the non-priority region Sn, for example, the priority region Sp may be set to the face part of a person, which serves as the target Ob, and the non-priority region Sn may be set to the regions other than the priority region Sn. In this case, when the non-priority region Sn is a still image, the display unit 21 displays a video in which only the face part of a person is moving.

When the video range So is divided into the three types of regions, the boundary region Sb does not have to be set between the priority region Sp and the non-priority region Sn. Instead, the video range So may be divided into three types of regions using other references. For example, the face part of a person serving as the target Ob is set as the priority region Sp, the waist of the person is set as a semi-priority region, and the region other than these regions is set as the non-priority region Sn. Alternatively, the part corresponding to a person serving as the target Ob is set as the priority region Sp, the part surrounding the person is set as the semi-priority region, and the region other than these regions is set as the non-priority region Sn. The video quality decreases in the order of the priority region Sp, the semi-priority region, and the non-priority region Sn.

As another option, the video quality setting unit 13c may set the video range So to part of a range included in a video recorded by the video-recording unit 11, that is, part of a recording range. That is, part of the recording range may be a range displayed by the display unit 21 of the video output device 200. For example, when the video-recording unit 11 records over a range of 360° with the video-recording unit 11 centered and the display unit 21 is located only in front of the viewer Pd, the video quality setting unit 13c sets the video range So to part of the recording range in which the attention position Tp is centered in accordance with the size of the display region.

Example of Setting Process for Video Quality

Figure 6:
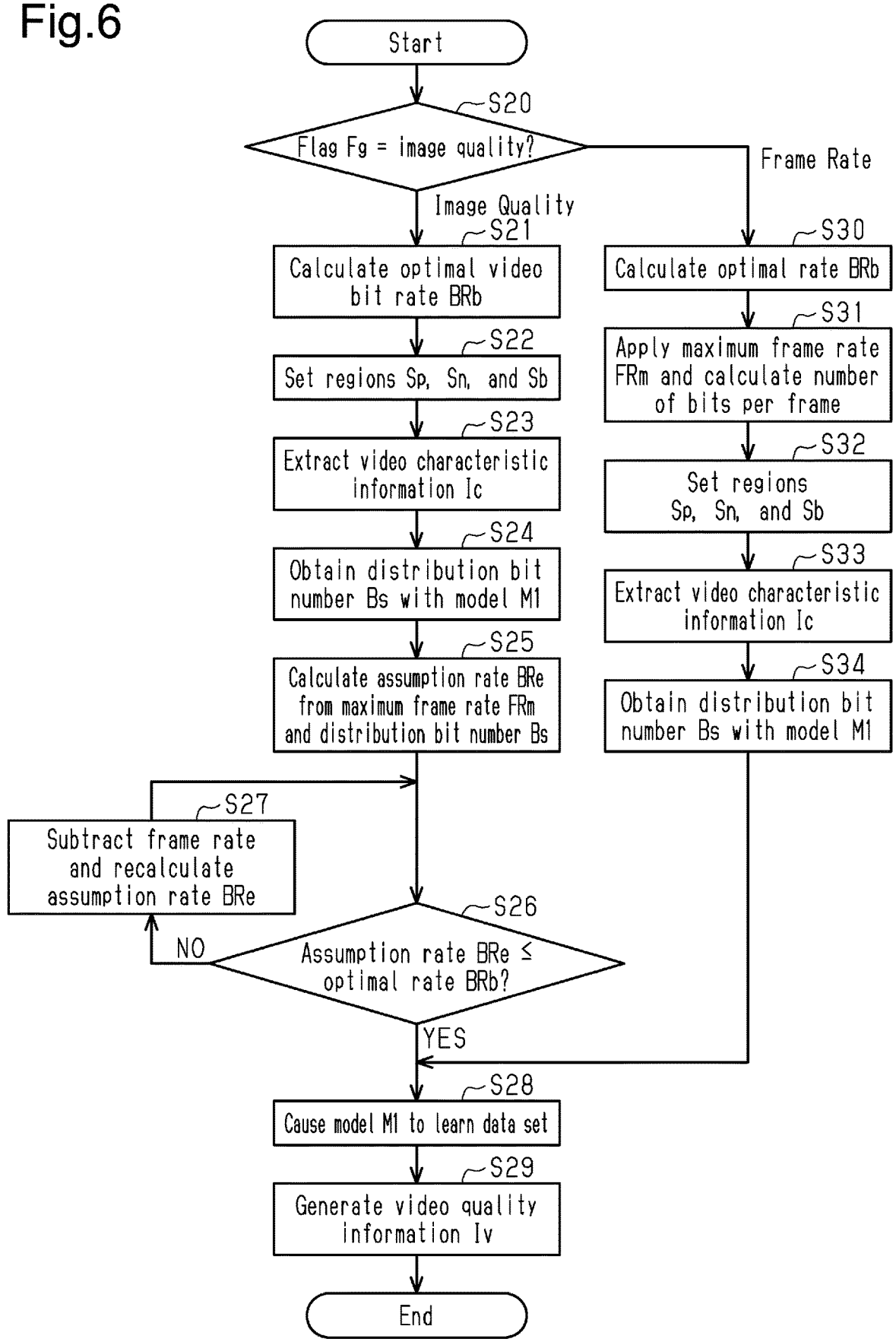
FIG. 6 is a flowchart illustrating an example of a procedure for determining an attention position and setting a video quality in the video transmission system of the first embodiment.
Figure 7:
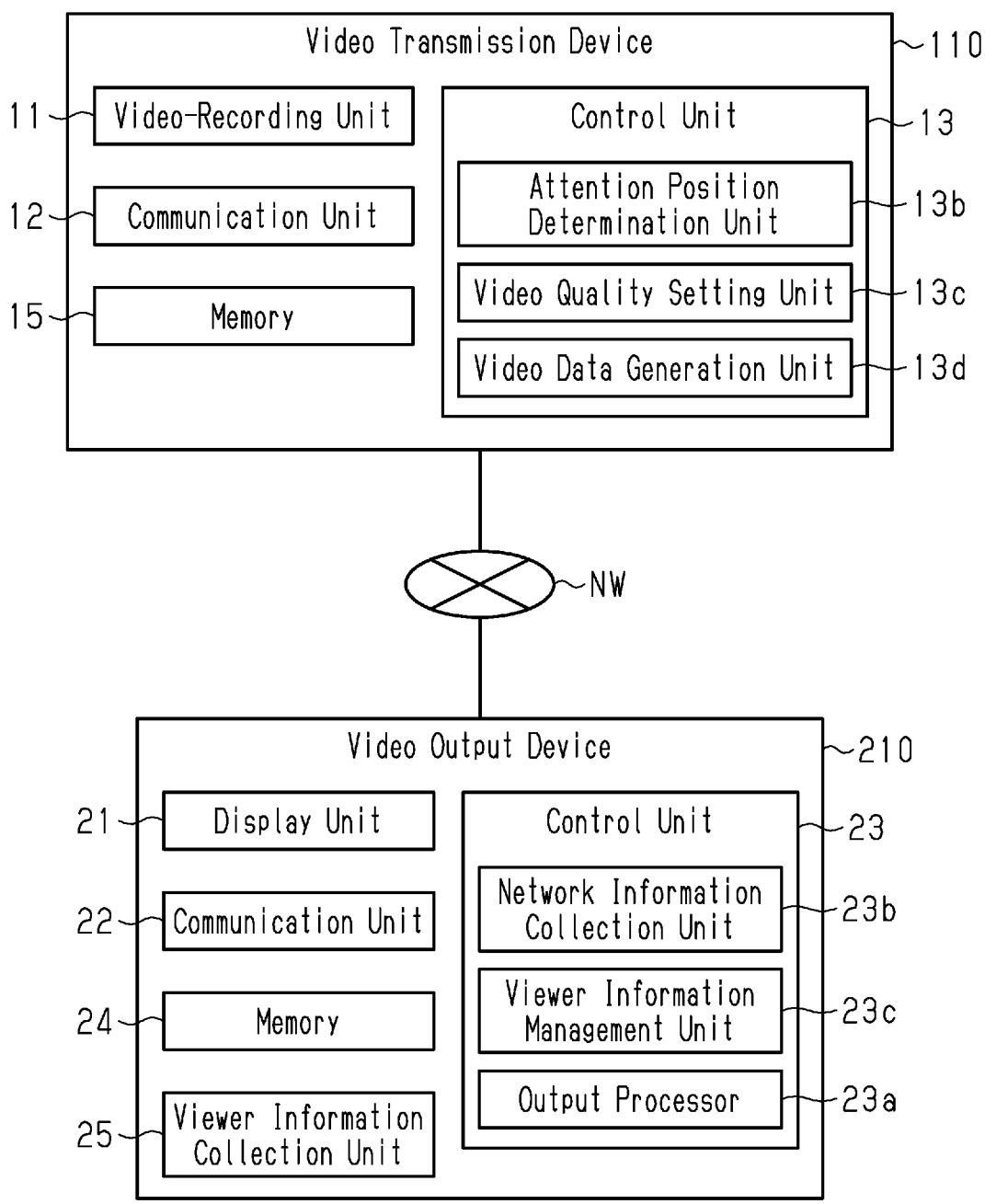
FIG. 7 is a diagram showing the configuration of a device provided in a video transmission system according to a second embodiment.

An example of the process for setting the video quality will now be described with reference to FIG. 6. FIG. 6 illustrates the flow of processes of step S11 previously described in FIG. 3, that is, a series of processes including the process for determining the attention position Tp and the process for setting the video quality. In the flow, the video range So is divided into three regions, namely, the priority region Sp, the non-priority region Sn, and the boundary region Sb, and the video quality of each of the regions Sp, Sn, and Sb is differentiated by the difference in bit rate. In the flow, to set the video quality, a picture quality/frame rate priority flag Fg (hereinafter referred to as the priority flag Fg), video characteristic information Ic, and a video quality learning model M1 are used. First, these elements will be described.

The priority flag Fg defines which to prioritize an image quality or a frame rate. Prioritizing the image quality means putting emphasis on increasing the sharpness of an image in a frame. Prioritizing the frame rate means putting emphasis on increasing the smoothness of a motion in a video. For example, the priority flag Fg is set based on the intention of a user of the video transmission system such as a meeting participant and recorded in the memory 15.

The video characteristic information Ic indicates the characteristics of the distribution of gradations in the video range So in the recorded data Dr. For example, the video characteristic information Ic is a luminance change amount in a vector quantity per unit division. The fact that the luminance change amount is large means that the video shown by the recorded data Dr is a video having edges, that is, a video in which local changes in brightness are large.

The video quality learning model M1 indicates a correlation between the video characteristic information Ic and a distribution bit number Bs for each of the regions Sp, Sn, and Sb. The distribution bit number Bs indicates the number of bits allocated to each of the regions Sp, Sn, and Sb per frame in the amount of one-second data, which is defined as a bit rate. The distribution bit number Bs is set such that the number of bits per pixel is the largest in the priority region Sp and the number of bits per pixel decreases in the order of the boundary region Sb and the non-priority region Sn. Thus, the bit rate per pixel decreases in the order of the priority region Sp, the boundary region Sb, and the non-priority region Sn. The video quality learning model M1 is stored in the memory 15.

As described above, the video quality differs between the priority region Sp, the non-priority region Sn, and the boundary region Sb. However, if the difference is excessively large, the videos are connected unnaturally between the regions Sp, Sn, and Sb. In this case, the viewer Pd may have discomfort. The characteristics of the distribution of gradations in a video change how much difference is suitable in the video quality between the regions Sp, Sn, and Sb. For example, a video with a small luminance change amount produces a smaller discomfort of the viewer Pd than a video with a large luminance change amount even if the difference in the video quality between the regions Sp, Sn, and Sb is set to be large. The video quality learning model M1 is established taking into account such circumstance to calculate the distribution bit number Bs suitable for the video characteristic information Ic. More specifically, the distribution bit number Bs is calculated such that as the luminance change amount serving as the video characteristic information Ic increases, the difference in the video quality between the priority region Sp and the other regions (i.e., the difference in the bit rate per pixel) decreases.

In addition to the video characteristic information Ic, the explanatory variables of the video quality learning model M1 may include a frame rate and a video bit rate, which are assigned to a video content rather than an audio content. An assumption value simply needs to be set to an explanatory variable to which an actual value is not input. Alternatively, in addition to the distribution bit number Bs, the objective variables of the video quality learning model M1 may include a video bit rate and a frame rate. The video quality learning model M1 is modified by learning a data set including the bit rate, the frame rate, and the distribution bit number Bs that are finally applied in addition to the video characteristic information Ic.

The flow illustrated in FIG. 6 will now be described. First, as the process of step S20, the control unit 13 determines whether the priority flag Fg is set for the image quality or the frame rate. When the priority flag Fg indicates that the image quality is prioritized, the control unit 13 proceeds to the process of step S21. When the priority flag Fg indicates that the frame rate is prioritized, the control unit 13 proceeds to the process of step S30.

The processes subsequent to step S21, that is, the processes performed when the priority flag Fg indicates that the image quality is prioritized, will now be described. As the process of step S21, the control unit 13 uses the network information In to calculate a bit rate at which data can be smoothly transmitted and further calculate an optimal video bit rate BRb, which can be allocated to a video content. Then, as the process of step S22, the control unit 13 determines the attention position Tp using the position determination information Ip and sets the priority region Sp, the non-priority region Sn, and the boundary region Sb to the video range So based on the attention position Tp.

Subsequently, as the process of step S23, for example, focusing on a frame extracted at a predetermined standard, the control unit 13 extracts the video characteristic information Ic from the recorded data Dr. The processes of step S21 to step S23 do not have to be performed in the above-described order.

Next, as the process of step S24, the control unit 13 inputs the video characteristic information Ic to the video quality learning model M1 to obtain the distribution bit number Bs for each of the regions Sp, Sn, and Sb. Subsequently, as the process of step S25, the control unit 13 calculates an assumption video bit rate BRe, which is needed when the obtained distribution bit number Bs and a maximum frame rate FRm are applied. The maximum frame rate FRm is a frame rate in the recorded data Dr and is a maximum frame rate applicable to the video data Dv.

As the process of step S26, the control unit 13 determines whether the assumption video bit rate BRe is less than or equal to the optimal video bit rate BRb. When the assumption video bit rate BRe is greater than the optimal video bit rate BRb (negative determination in step S26), the control unit 13 proceeds to the process of step S27. In this process, the control unit 13 sets, as a new frame rate, a value obtained by subtracting a predetermined value from the maximum frame rate FRm and recalculates the assumption video bit rate BRe from the new frame rate and the above-described distribution bit number Bs. The processes of step S26 and step S27 are repeated until the assumption video bit rate BRe becomes less than or equal to the optimal video bit rate BRb.

When the assumption video bit rate BRe is less than or equal to the optimal video bit rate BRb (affirmative determination in step S26), the control unit 13 proceeds to the process of step S28. In the process of step S28, the control unit 13 defines the frame rate that has been applied during the calculation of the assumption video bit rate BRe as a frame rate that is to be applied to the video data Dv and defines the assumption video bit rate BRe as a video bit rate that is to be applied to the video data Dv. The control unit 13 causes the video quality learning model M1 to learn a data set including the defined video bit rate, the defined frame rate, the distribution bit number Bs, and the video characteristic information Ic.

Afterwards, as the process of step S29, the control unit 13 generates the video quality information Iv including the ranges of the priority region Sp, the non-priority region Sn, and the boundary region Sb set in step S22, the video bit rate and the frame rate defined in step S28, and the distribution bit number Bs obtained in step S24, thereby ending the processes.

The processes subsequent to step S30, that is, the processes performed when the priority flag Fg indicates that the frame rate is prioritized, will now be described. As the process of step S30, the control unit 13 uses the network information In to calculate a bit rate at which data can be smoothly transmitted and further calculate the optimal video bit rate BRb.

Then, as the process of step S31, the control unit 13 calculates the number of bits per frame obtained when the maximum frame rate FRm is applied to the optimal video bit rate BRb. Subsequently, as the process of step S32, the control unit 13 determines the attention position Tp using the position determination information Ip and sets the priority region Sp, the non-priority region Sn, and the boundary region Sb to the video range So based on the attention position Tp.

Afterwards, as the process of step S33, for example, focusing on a frame extracted at a predetermined standard, the control unit 13 extracts the video characteristic information Ic from the recorded data Dr. The processes of steps S30 and S31, step S32, and step S33 do not have to be performed in the above-described order.

Next, as the process of step S34, the control unit 13 inputs the number of bits per frame calculated in step S31 and the video characteristic information Ic to the video quality learning model M1 to obtain the distribution bit number Bs for each of the regions Sp, Sn, and Sb. The distribution bit number Bs is calculated as a value obtained by dividing the number of bits per frame.

Subsequently, as the process of step S28, the control unit 13 defines the optimal video bit rate BRb as a video bit rate applied to the video data Dv and defines the maximum frame rate FRm as a frame rate applied to the video data Dv. The control unit 13 causes the video quality learning model M1 to learn a data set including the defined video bit rate, the defined frame rate, the distribution bit number Bs, and the video characteristic information Ic.

Afterwards, as the process of step S29, the control unit 13 generates the video quality information Iv including the ranges of the priority region Sp, the non-priority region Sn, and the boundary region Sb set in step S32, the video bit rate and the frame rate defined in step S28, and the distribution bit number Bs obtained in step S34, thereby ending the processes.

In the above-described flow, the video characteristic information Ic is input to the video quality learning model M1, and the distribution bit number Bs is output. The input parameters of the video quality learning model M1 simply need to include at least the video characteristic information Ic and may include the optimal video bit rate BRb and the maximum frame rate FRm in addition to the video characteristic information Ic. Further, the output parameters of the video quality learning model M1 simply need to include at least the distribution bit number Bs and may include the video bit rate and the frame rate applied to the video data Dv in addition to the distribution bit number Bs.

Further, when the image filter is applied to produce differences in the video quality, the input parameters or the output parameters may include a parameter such as a constant that defines the image filter.

In the above-described example, the priority flag Fg is set based on the intention of the user of the video transmission system. Instead, the priority flag Fg may be set by the control unit 13 based on, for example, the network information In and the video characteristic information Ic.

Generation Process for Video Data

The process for generating the video data Dv performed by the video data generation unit 13d of the control unit 13 of the video transmission device 100 will now be described in detail.

The video data generation unit 13d uses the video quality information Iv to generate the video data Dv from the recorded data Dr. The video quality information Iv includes information of, for example, various parameters used to generate the video data Dv including the video quality set by the video quality setting unit 13c.

The process for generating the video data Dv includes processing for adapting a video recorded by the video-recording unit 11 to the shape of the display region of the display unit 21 of the video output device 200 to display the adapted video on the display unit 21. Such processing includes a stitching process for connecting the recorded videos of multiple regions to generate a full-circle video and includes processing for a video in accordance with an equirectangular projection. In a case in which a video is generated in accordance with the equirectangular projection, in order to properly reduce the volume of the video data Dv while maintaining the geometric consistency between drawing and transmission, conversion is preferably performed such that the center of the priority region Sp is located on the center in the equirectangular projection.

Operation

The operation of the video transmission system of the first embodiment will now be described. In the video transmission system, the video qualities of the regions other than the priority region Sp are lower than the video quality of the priority region Sp. Thus, as compared to when the entire video range So has the same video quality as the priority region Sp, the volume of the video data Dv can be reduced. Accordingly, even if the transmission device 100 transmits, to the video output device 200, the video data Dv for displaying a situation over a wide range, an increase in the communication load is limited.

The priority region Sp includes the attention position Tp. Thus, the display unit 21 displays a video showing that the region to which the viewer Pd is estimated to pay attention has a relatively high video quality and the other regions have a relatively low video quality. That is, the video quality is high at the central portion of the field of view of the viewer Pd, and the video quality is low at the perimeter of the field of view of the viewer Pd. Thus, the viewer Pd views a situation in the first space R1 as if the viewer Pd is located in the first space R1. Further, movement or change of the target Ob moves or changes the attention position Tp, thereby moving or changing the priority region Sp. In such a configuration, the display unit 21 displays a video corresponding to the perspective of the viewer Pd. Thus, the viewer Pd feels more realistic.

This makes the viewer Pd feel more realistic while limiting an increase in the communication load for transmitting the video data Dv.

Further, the difference in the video quality between the priority region Sp and the other regions is determined based on the network information In. That is, the communication status between the video transmission device 100 and the video output device 200 is taken into account to set the video quality. Thus, the video qualities of the priority region Sp and the other regions can be set in accordance with the status of the communication status. This properly limits an increase in the communication load for transmitting the video data Dv.

Furthermore, the attention position Tp is determined based on the fact that the position of the target Ob in the first space R1 is detected, and the priority region Sp is set based on the attention position Tp. Thus, the target to which the viewer Pd is estimated to pay attention can be properly incorporated in the priority region Sp. In addition, the attention position Tp and the priority region Sp are determined based only on the information collected by the video transmission device 100. This allows for smooth processing by the video transmission device 100.

Additionally, the attention position Tp is determined based on the orientation of the video transmission device 100, and the priority region Sp is set based on the attention position Tp. Thus, the region serving as the priority region Sp can be controlled by controlling the orientation of the video transmission device 100. Particularly, in a mode in which the orientation of the video transmission device 100 can be changed through a remote operation by the viewer Pd, the intention of the viewer Pd is reflected on the setting of the priority region Sp. This allows for outputting of a video that properly satisfies the wish of the viewer Pd.

Moreover, the video range So is divided into the three types of regions, namely, the priority region Sp, the boundary region Sb, and the non-priority region Sn, and the video quality decreases in the order of the priority region Sp, the boundary region Sb, and the non-priority region Sn. Thus, as compared to when the video quality changes abruptly from the priority region Sp to the non-priority region Sn, the discomfort of the viewer Pd, which would result from the difference in the video quality, is reduced.

As described above, the first embodiment has the following advantages.

(1) The video transmission device 100 divides the video range So, which is included in a video recorded by the video-recording unit 11, into multiple regions including the priority region Sp, which has the attention position Tp. The video transmission device 100 sets the video quality of the region not including the attention position Tp to be lower than the video qualities of the priority region Sp. In such a configuration, as compared to when the same video quality as the video quality of the priority region Sp is applied to the entire video range So, the volume of the video data Dv can be reduced. The priority region Sp has the attention position Tp. Thus, the display unit 21 displays a video showing that the region to which the viewer Pd is estimated to pay attention has a relatively high video quality and the other regions have a relatively low video quality. That is, the display unit 21 displays a video corresponding to the perspective of the viewer Pd. As a result, the viewer Pd feels more realistic.

(2) In the configuration in which the attention position Tp is determined based on the position determination information Ip, which is used to detect the position of the target Ob, the priority region Sp, of which the video quality is set to be high, is set in accordance with the position of the target Ob in the first space R1. Thus, the target to which the viewer Pd is estimated to pay attention can be properly incorporated in the priority region Sp.

(3) In the configuration in which the attention position Tp is determined based on the orientation of the video transmission device 100, the region serving as the priority region Sp can be controlled by controlling the orientation of the video transmission device 100. This increases the convenience for the user of the video transmission system and allows the user to easily acknowledge the region serving as the priority region Sp in an objective manner. Particularly, in the mode in which the orientation of the video transmission device 100 can be changed through a remote operation by the viewer Pd, the intention of the viewer Pd is reflected on the setting of the priority region Sp. This allows for outputting of a video that properly satisfies the wish of the viewer Pd.

(4) The video qualities of the priority region Sp and the other regions are set based on the network information In. Thus, a communication status is taken into account to set the video qualities. Thus, the video quality of each region can be set in accordance with whether the communication status is good or bad. This properly limits an increase in the communication load for transmitting the video data Dv.

(5) The video range So is divided into the priority region Sp, the non-priority region Sn, and the boundary region Sb. The video quality of the boundary region Sb is set to be lower than the video quality of the priority region Sp, and the video quality of the non-priority region Sn is set to be lower than the video quality of the boundary region Sb. In such a configuration, as compared to when the video quality abruptly changes from the priority region Sp to the non-priority region Sn, the discomfort of the viewer Pd, which would result from the difference in the video quality, is reduced.

(6) The video quality includes at least one of the sharpness of an image included in a video or the smoothness of a motion in a video. In this configuration, the volume of the video data Dv can be properly reduced by reducing the video qualities other than the video quality of the priority region Sp.

(7) In the configuration in which the video quality of the region not including the attention position Tp is set to be lower than the video qualities of the priority region Sp by setting the bit rate of the region not including the attention position Tp to be lower than the bit rate of the priority region Sp, the video quality can be easily set. Further, the volume of the video data Dv can be properly reduced.

(8) In the configuration in which the luminance change amount is used to set the video quality as the video characteristic information Ic such that the difference in the video quality between the priority region Sp and the other regions decreases as the luminance change amount increases, the difference in the video quality decreases as the brightness change in an image configuring a video increases. Thus, the more easily the difference of the video quality in a video can be recognized, the smaller the difference of the video quality becomes between the regions. As a result, the discomfort of the user, which would result from the difference in the video quality, is reduced.

(9) In the configuration in which the video quality (i.e., the bit rate and the frame rate used for the video data Dv) differs between a case in which increasing the image quality is prioritized and a case in which increasing the frame rate is prioritized, the video quality can be set in accordance with a situation. This increases the convenience for the user of the video transmission system.

Second Embodiment

A video transmission system according to a second embodiment will now be described with reference to FIGS. 7 to 10. The second embodiment differs from the first embodiment in that the video output device in the second space R2 collects information used to determine the attention position Tp and obtains the network information In. The following description focuses on the difference of the second embodiment from the first embodiment. In the second embodiment, like or the same reference numerals are given to those components that are like or the same as the corresponding components of the first embodiment and detailed explanations are omitted.

Configuration of Video Transmission System

The functional configuration of the video transmission system of the second embodiment will now be described. In the second embodiment, the video transmission system includes a video transmission device 110, which is arranged in the first space R1, and a video output device 210, which is arranged in the second space R2. The video transmission device 110 and the video output device 210 transmit and receive data to and from each other via the network NW.

The video transmission device 110 includes the video-recording unit 11, the communication unit 12, the control unit 13, and the memory 15. The video transmission device 110 of the second embodiment does not include the position information collection unit 14. The elements of the video transmission device 110 may be integrally coupled to each other. Alternatively, at least part of the elements may be arranged separately from the other elements. The control unit 13 may be connected to the elements other than the control unit 13 in a wireless or wired manner. The video transmission device 110 is applied to, for example, a telepresence robot.

Each of the video-recording unit 11, the communication unit 12, and the memory 15 has the same configuration as the first embodiment. The control unit 13 includes, as functional units configuring the video transmission system, the attention position determination unit 13b, the video quality setting unit 13c, and the video data generation unit 13d. The control unit 13 does not include the network information obtaining unit 13a.

The attention position determination unit 13b determines the attention position Tp in the first space R1 based on line-of-sight information Iw, which is received from the video output device 210 via the communication unit 12.

The video quality setting unit 13c divides the video range So into multiple regions based on the network information In, which is received from the video output device 210 via the communication unit 12, and based on the information including the attention position Tp. Further, the video quality setting unit 13c sets the video quality of each region. That is, the video quality setting unit 13c determines the video quality of each region such that the region not including the attention position Tp has a lower video quality than the priority region Sp including the attention position Tp. The video quality setting unit 13c outputs the video quality information Iv, which indicates the video quality of each region.

The video data generation unit 13d generates the video data Dv from the recorded data Dr, which is generated when the video-recording unit 11 records a video, in accordance with the video quality information Iv. The video data generation unit 13d transmits the video data Dv to the video output device 210 via the communication unit 12.

In addition to the display unit 21, the communication unit 22, the control unit 23, and the memory 24, the video output device 210 includes a viewer information collection unit 25. The elements of the video output device 210 may be integrally coupled to each other. Alternatively, at least part of the elements may be arranged separately from the other elements. The control unit 23 may be connected to the elements other than the control unit 23 in a wireless or wired manner.

Each of the display unit 21, the communication unit 22, and the memory 24 has the same configuration as the first embodiment. The viewer information collection unit 25 collects information that is used to detect the line-of-sight direction of the viewer Pd. The viewer information collection unit 25 includes, for example, an infrared ray laser device and its photoreceptor, a millimeter wave radar device, and an image-capturing device such as a camera.

In addition to the output processor 23a, the control unit 23 includes a network information obtaining unit 23b and a viewer information management unit 23c as functional units configuring the video transmission system.

The network information obtaining unit 23b obtains network information In via the communication unit 22. The network information In indicates a communication status between the video transmission device 110 and the video output device 210 using the network NW. In the second embodiment, the network NW is information of at least one line included in a downward communication channel from the video transmission device 110 to the video output device 210 as viewed from the video output device 210.

The viewer information management unit 23c generates the line-of-sight information Iw based on the information collected by the viewer information collection unit 25. The network information In and the line-of-sight information Iw are transmitted to the video transmission device 110 via the communication unit 22. The line-of-sight information Iw is information indicating the line-of-sight direction of the viewer Pd or information from which the line-of-sight direction of the viewer Pd can be calculated. The line-of-sight information Iw may be information obtained as a result of calculation using information output from the viewer information collection unit 25 or may be information output from the viewer information collection unit 25.

The output processor 23a adds necessary conversion to the video data Dv received by the communication unit 22 from the video transmission device 110 in conformance with the shape of the display region or the like and causes the display unit 21 to display the video based on the video data Dv.

Operation of Video Transmission System

Figure 8:
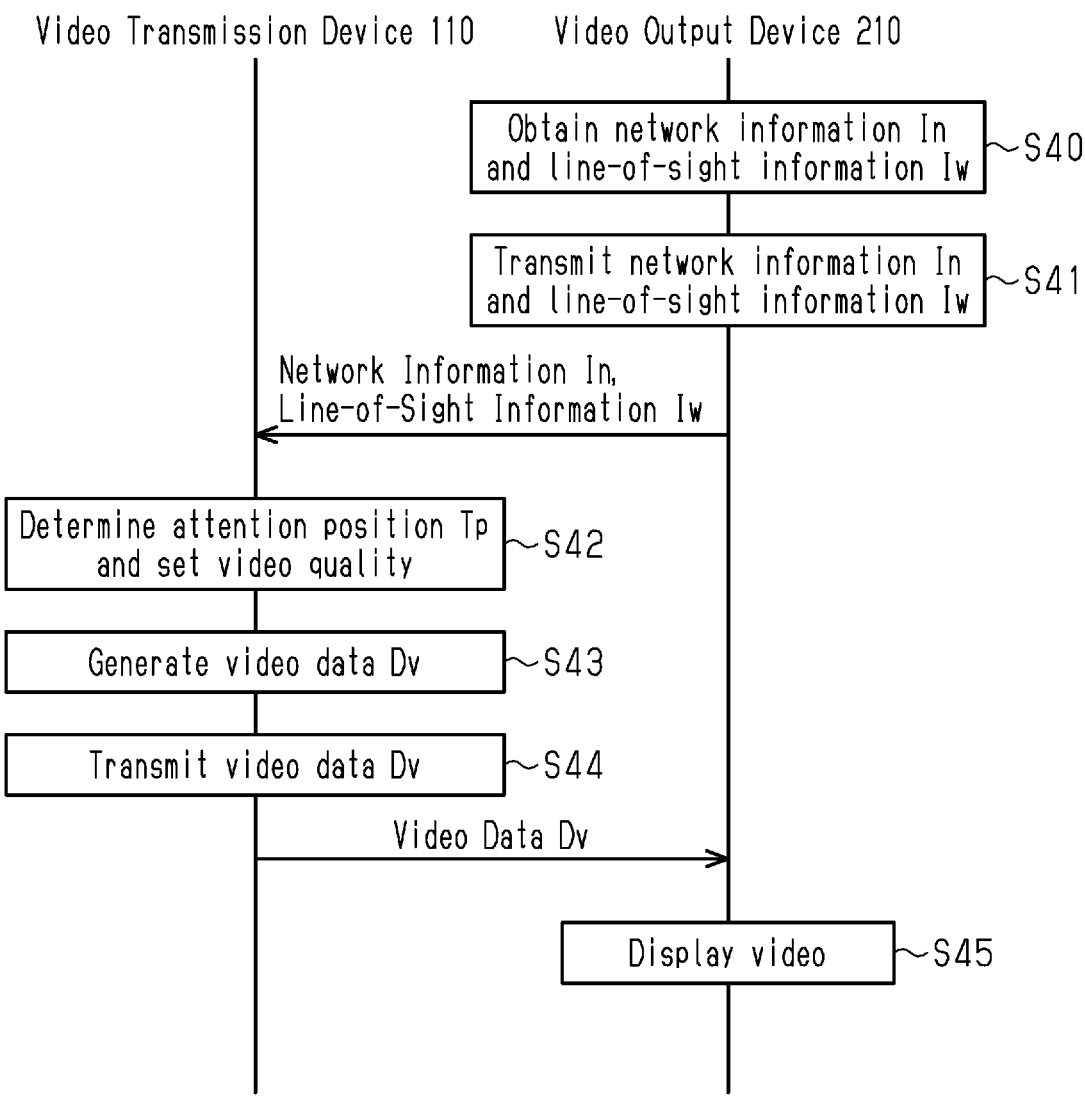
FIG. 8 is a sequence chart schematically illustrating a procedure for the video transmission system of the second embodiment.

The overview of a procedure for the video transmission system of the second embodiment will now be described with reference to FIG. 8. The processes shown in FIG. 8 are performed during a period in which the video-recording unit 11 is recording a video.

First, the control unit 23 of the video output device 210 obtains the line-of-sight information Iw based on the collection of information by the viewer information collection unit 25 and obtains the network information In (step S40).

Subsequently, the control unit 23 transmits the line-of-sight information Iw and the network information In to the video transmission device 110 via the communication unit 22 (step S41).

When receiving the line-of-sight information Iw and the network information In, the control unit 13 of the video transmission device 110 uses the received information to determine the attention position Tp, divide the video range So into multiple regions, and set the video quality of each region (step S42).

Then, the control unit 13 generates the video data Dv by converting the recorded data Dr in accordance with the video quality information Iv, which indicates the video quality set in step S42 (step S43).

When the video data Dv is generated, the control unit 13 transmits the video data Dv to the video output device 210 via the communication unit 12 (step S44).

When receiving the video data Dv, the control unit 23 of the video output device 210 causes the display unit 21 to display the video using the video data Dv (step S45).

In the processes shown in FIG. 8, the processes of step S40 to step S42 may be performed in a predetermined interval while the video-recording unit 11 is recording a video. Alternatively, the processes of steps S41 and step S42 may be performed only when the process of step S40 was performed in the predetermined interval and either the line-of-sight information Iw or the network information In has changed from the previous time in which it was obtained. As another option, the process of step S42 may be performed only when the processes of step S40 and step S41 were performed in the predetermined interval and either the line-of-sight information Iw or the network information In has changed from the previous time in which it was obtained.

In the process of step S43, using new video quality information Iv, the processes of step S43 to step S45 are successively performed for the recorded data Dr received by the control unit 13 such that a video showing a situation in the first space R1 is displayed on the video output device 210 of the second space R2.

Generation Process for Line-of-Sight Information and Determination Process for Attention Position The process for generating the line-of-sight information Iw performed by the viewer information management unit 23c of the control unit 23 of the video output device 210 and the process for determining the attention position Tp performed by the attention position determination unit 13b of the control unit 13 of the video transmission device 110 will now be described in detail.

Figure 9:
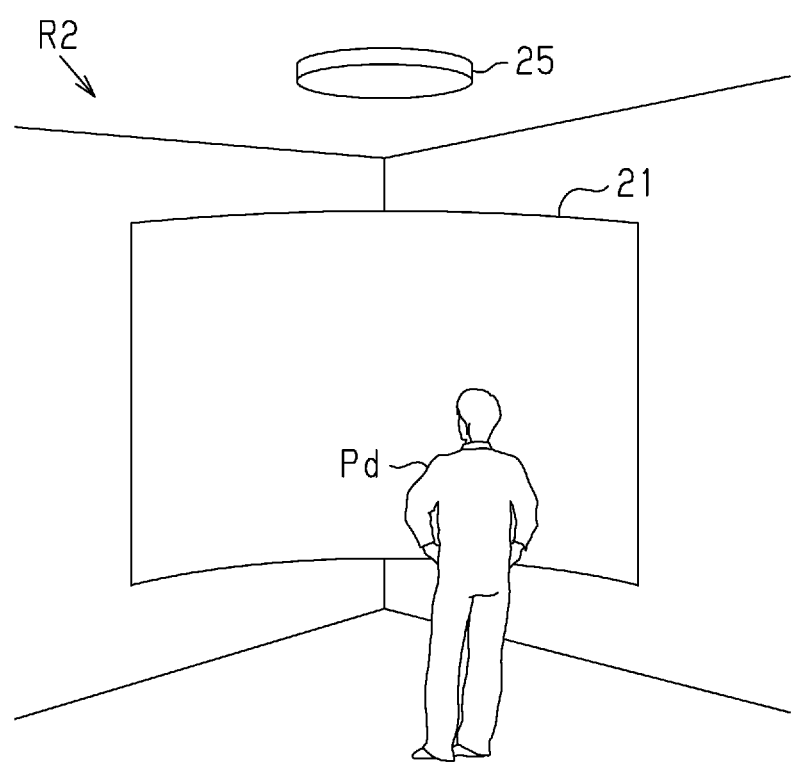
FIG. 9 is a diagram showing an example of the arrangement of a viewer information collection unit in the video transmission system of the second embodiment.
Figure 10:
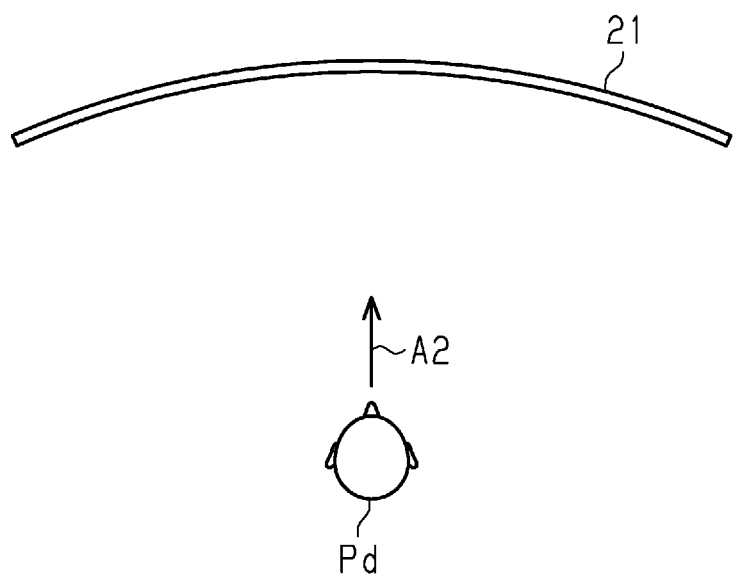
FIG. 10 is a diagram showing an example of a line-of-sight direction of a viewer to be detected in the video transmission system of the second embodiment.

As shown in FIG. 9, the device configuring the viewer information collection unit 25 of the video output device 210 is arranged at, for example, the upper part of the second space R2 to collect information used to detect the line-of-sight direction of the viewer Pd. Based on the information output by the viewer information collection unit 25, for example, the position or motion of a person is detected and the position of the head is detected with image analysis. Based on the detection, the line-of-sight direction of the viewer Pd is obtained.

The line-of-sight direction of the viewer Pd may be obtained either by the video output device 210 or by the video transmission device 110. That is, the viewer information management unit 23c may transmit, to the video transmission device 110 as the line-of-sight information Iw, the information indicating the line-of-sight direction obtained based on the information output by the viewer information collection unit 25. Alternatively, the viewer information management unit 23c may transmit, to the video transmission device 110 as the line-of-sight information Iw, information which is based on the output of the viewer information collection unit 25 and from which the line-of-sight direction of the viewer Pd can be obtained at the video transmission device 110.

The line-of-sight direction of the viewer Pd is a direction in which the viewer Pd is looking. For example, as shown by an arrow A2 in FIG. 10, the line-of-sight direction of the viewer Pd is defined by the orientation of the head of the viewer Pd in the horizontal plane (i.e., the orientation of the head of the viewer Pd as viewed from directly above the viewer Pd). The direction extending frontward from the face of the viewer Pd is the line-of-sight direction of the viewer Pd.

Alternatively, the line-of-sight direction of the viewer Pd may be defined by the orientation or by the orientation and position of the viewer Pd in a three-dimensional orthogonal coordinate system. The viewer information collection unit 25 simply needs to be configured to collect information in accordance with the method for calculating the line-of-sight direction. Further, a device such as a sensor used to obtain the line-of-sight direction may be attached to the viewer Pd. The sensor is, for example, a gyro sensor, an acceleration sensor, or a geomagnetic sensor. Such a device configures the viewer information collection unit 25. As another option, the viewer information collection unit 25 may be a device such as the sensor attached to the viewer Pd.

The attention position determination unit 13b of the video transmission device 110 determines the attention position Tp in the first space R1 in accordance with the line-of-sight direction that is based on the line-of-sight information Iw. For example, the initial position of the attention position Tp is set at a predetermined position in the first space R1, and the attention position Tp is moved so as to change a direction toward the attention position Tp from a reference point serving as the position of the video transmission device 110 in accordance with a change in the line-of-sight direction. Alternatively, a three-dimensional orthogonal coordinate system is set for each of the first space R1 and the second space R2 and an axial direction is shared such that the vertical, horizontal, and front-to-rear directions coincide. The attention position Tp defined by the coordinate system of the first space R1 is determined in accordance with the line-of-sight direction defined by the coordinate system of the second space R2.

In short, the attention position Tp simply needs to be determined to move in synchronization with a change in the line-of-sight direction. That is, the attention position Tp is moved in correspondence with a change in the line-of-sight direction, and the priority region Sp moves as the attention position Tp moves. In the second embodiment, the process for setting the video quality and the process for generating the video data Dv are performed in the same manner as the first embodiment.

In the second embodiment, the orientation of the video transmission device 110 may be remotely operated by the viewer Pd in the second space R2. However, in the configuration of the second embodiment, the priority region Sp can be moved by changing the line-of-sight direction of the viewer Pd (i.e., by changing the orientation of the viewer Pd) without changing the orientation of the video transmission device 110. The orientation of the video transmission device 110 may be changed based on the determination of the attention position Tp instead of the remote operation by the viewer Pd such that the video transmission device 110 is oriented toward the attention position Tp.

Operation

The operation of the video transmission system according to the second embodiment will now be described. In the second embodiment, the video qualities of the regions other than the priority region Sp are lower than the video quality of the priority region Sp. This reduces the volume of the video data Dv and thus limits an increase in the communication load. Further, the priority region Sp includes the attention position Tp. This allows the display unit 21 to display a video corresponding to the perspective of the viewer Pd and thus make the viewer Pd feel more realistic.

In the second embodiment, the attention position Tp is determined based on the line-of-sight direction of the viewer Pd, and the priority region Sp is set based on the attention position Tp. Thus, the intention of the viewer Pd is easily reflected on the setting of the priority region Sp. This allows the display unit 21 to output a video that further satisfies the wish of the viewer Pd. Accordingly, the viewer Pd feels more satisfied. In addition, since the priority region Sp moves as the line-of-sight direction of the viewer Pd changes, the viewer Pd feels even more realistic.

The second embodiment has the following advantage in addition to the advantages (1) and (4) to (9) of the first embodiment.

(10) The priority region Sp, where the video quality is high, is set in accordance with the line-of-sight direction of the viewer Pd. Thus, the intention of the viewer is easily reflected on the setting of the priority region Sp. This allows the display unit 21 to display a video that properly satisfies the wish of the viewer Pd. Further, since the video properly conforms to the viewpoint of the viewer Pd, the viewer Pd feels even more realistic.

Applications

In each of the above-described embodiments, the video transmission system is used for person-to-person remote communication. However, the purpose of the video transmission system is not limited to such communication. Applications of the video transmission system for other purposes will now be described. Either the video transmission system of the first embodiment or the video transmission system of the second embodiment may be applied to the following applications.

Application 1: Remote Working

The video transmission system of application 1 is used for remote working. In application 1, the viewer Pd is a worker. The first space R1 is a workplace such as the office of a company or a shared office. The second space R2 is not particularly limited and is, for example, the home of the viewer Pd. Alternatively, the second space R2 is a different site of the company or an office such as a shared office. The viewer Pd conducts work while viewing a situation of the first space R1 displayed on the display unit 21. The work may be conducted only in the second space R2. Alternatively, the work may be conducted in the first space R1 by remotely operating a device in the first space R1 by the viewer Pd. A person does not have to be located in the first space R1. When the video transmission system of the first embodiment is applied, the target Ob is not limited to a person and may be a document or an article subject to work.

Application 1 allows the viewer Pd to work more realistically as if he or she is located in a workplace while being located in a space distant from the workplace, thereby improving the working efficiency.

Application 2: Remote Sightseeing

The video transmission system of application 2 is used for remote sightseeing. In application 2, the viewer Pd is a tourist. The first space R1 is a sightseeing destination such as a tourist facility or a shopping complex. A tourist facility includes a museum, an aquarium, an art museum, and a sightseeing spot such as a cultural asset. The second space R2 is not particularly limited and is, for example, the home of the viewer Pd, a school, a convention center, a shopping complex, a nursing facility, or a hospital. The viewer Pd does sightseeing by viewing a situation of the first space R1 displayed on the display unit 21. A person does not have to be located in the first space R1. When the video transmission system of the first embodiment is applied, the target Ob is, for example, an animal, a plant, a facility such as a building, or an exhibit.

Application 2 allows the viewer Pd to do sightseeing more realistically while being located in a space distant from a sightseeing destination, thereby making the viewer Pd feel more interested.

Application 3: Remote Diagnosis

The video transmission system of application 3 is used for remote diagnosis. In application 3, the viewer Pd is a healthcare worker such as a doctor or a nurse. The first space R1 is an institution where patients are diagnosed such as a local clinic or a clinic on an isolated island. The second space R2 is not particularly limited and is, for example, a hospital in an urban area or a classroom of a medical college. The viewer Pd conducts diagnosis by viewing a situation of the first space R1 displayed on the display unit 21. A patient is located in the first space R1. When the video transmission system of the first embodiment is applied, the target Ob is a patient or an affected area of a patient.

Application 3 allows the viewer Pd to conduct a more realistic diagnosis as if he or she is located in the same space as a patient while being located in a space distant from the patient, thereby allowing the viewer Pd to conduct diagnosis suitable for a symptom of the patient even in a remote place.

Application 4: Remote Agriculture

The video transmission system of application 4 is used for remote agriculture. In application 4, the viewer Pd is a farmer. The first space R1 is a farming facility such as a paddy field, a field, a polytunnel, or a forest. The second space R2 is not particularly limited and is, for example, the home of the viewer Pd or an office of a company or the like. The viewer Pd observes a crop and conducts farming by viewing a situation of the first space R1 displayed on the display unit 21. The farming is conducted in the first space R1 by remotely operating a device in the first space R1 by the viewer Pd. A person does not have to be located in the first space R1. When the video transmission system of the first embodiment is applied, the target Ob is, for example, a crop.

Application 4 allows the viewer Pd to observe a crop and conduct farming more realistically while being located in a space distant from a farming facility.

Modifications

The above-described embodiments and applications may be modified as follows.

In the first embodiment, the network information In may be obtained at the video output device 200 and transmitted to the video transmission device 100 in the same manner as the second embodiment. Further, in the second embodiment, the network information In may be obtained at the video transmission device 110 in the same manner as the first embodiment. Furthermore, in each of the first embodiment and the second embodiment, the network information In obtained at the video transmission device and the network information In obtained at the video output device may both be used to set the video quality.

In each of the above-described embodiments, the network information In is used to set a video quality (for example, set a video bit rate). Instead, the network information In may be used to set a region including the priority region Sp relative to the video range So. For example, the size of the region including the priority region Sp may be defined in accordance with the network information In. More specifically, the more favorable the communication condition becomes, the larger the priority region Sp becomes.

The attention position Tp may be determined based on at least one of the position of the target Ob or the orientation of the video transmission device and on the line-of-sight direction of the viewer Pd.

The output processor 23a of the control unit 23 of the video output device may perform a process on a video shown by the video data Dv such that it is difficult for the viewer Pd to visually recognize the difference in the video quality between the priority region Sp and the other regions and then may cause the display unit 21 to display the processed video. Such a process includes, for example, the application of an image filter that obscures an object such as a moving average filter and a Gaussian filter. For example, in a case in which the video range So is divided into the priority region Sp, the non-priority region Sn, and the boundary region Sb, when the image filter is applied to the boundary region Sb, it is difficult for the viewer Pd to recognize the border between the adjacent regions. As a result, the discomfort of the viewer Pd, which would result from the difference in the video quality, is reduced.

The display unit 21 simply needs to be located in the second space R2 and may be carried by the viewer Pd. For example, the display unit 21 may be attached to the head of the viewer Pd.

The recording range of the video-recording unit 11 may be fixed or movable. For example, the recording range of the video-recording unit 11 may be moved in accordance with the attention position Tp such that the attention position Tp is located on the central portion of the recording range. In this case, the attention position Tp is determined and then the recording range of the video-recording unit 11 is determined, a region including the priority region Sp is set for the video range So in accordance with the recording range.

The video transmission device is not limited to a telepresence robot and may be a wearable device attached to a user in the first space R1. The orientation of the video transmission device attached to the user may be, for example, able to be changed by a remote operation by the viewer Pd or may be changed by the user's moving based on an instruction of the viewer Pd.

In each of the above-described embodiments, the video transmission device is configured to change the position and orientation of the video transmission device like a telepresence robot, and the position and orientation of the video transmission device are changed by performing a remote operation by the viewer Pd. Instead, the position and orientation of the video transmission device may be changed by a person in the first space R1. Alternatively, the position and orientation of the video transmission device does not have to be variable. For example, the video transmission device may be a device including a camera serving as a video-recording unit 11 fixed at a predetermined position and in a predetermined orientation. Further, the video transmission device may be a drone.

The first space R1 and the second space R2 may be included in a region of a single country or may be included in regions of different countries.

In addition to displaying a video of the first space R1 on the display unit 21 located in the second space R2, a video of the second space R2 may be displayed on the display unit located in the first space R1.

Artificial intelligence (AI) may be used to determine the attention position Tp and set the video quality.

Each of the control unit 13 of the video transmission device and the control unit 23 of the video output device is not limited to one that performs software processing on all processes executed by itself. For example, the control units 13 and 23 may include a dedicated hardware circuit (for example, application specific integrated circuit: ASIC) that executes hardware processing on at least part of the processes executed by itself. That is, the control units 13 and 23 may be circuitry including: 1) one or more processors that operate according to a computer program (software); 2) one or more dedicated hardware circuits that execute at least part of various processes, or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A video transmission system comprising:
   a video transmission device including a video-recording unit configured to record a situation in a first space; and
   a video output device including a display unit arranged in a second space, the video output device being connected to the video transmission device via a network, wherein
   the display unit is configured to display a video of the first space,
   the video transmission device includes circuitry configured to:
   determine an attention position where a viewer located in the second space is estimated to pay attention to the situation in the first space;
   divide a range included in a video recorded by the video-recording unit into multiple regions that include at least a first region and a second region, the first region including the attention position;
   set a first video quality for the first region and set a second video quality for the second region, the second video quality being lower than the first video quality;

generate video data from recorded data of the video-recording unit in accordance with the first video quality and the second video quality; and transmit the video data to the video output device, and the video output device includes circuitry configured to control the display unit using the video data received from the video transmission device such that the display unit displays the video showing the situation in the first space.

2. The video transmission system according to claim 1, wherein the video transmission device further includes a position information collection unit configured to collect information used to detect a position of a target located in the first space, and the circuitry of the video transmission device is further configured to determine the attention position based on the information collected by the position information collection unit.

3. The video transmission system according to claim 1, wherein the circuitry of the video transmission device is further configured to determine the attention position based on an orientation of the video transmission device.

4. The video transmission system according to claim 3, wherein the video transmission device is configured to change the orientation of the video transmission device through a remote operation by the viewer.

5. The video transmission system according to claim 1, wherein the video output device further includes a viewer information collection unit configured to collect information used to detect a line-of-sight direction of the viewer in the second space, the circuitry of the video output device is further configured to transmit line-of-sight information based on the information collected by the viewer information collection unit to the video transmission device, and the circuitry of the video transmission device is further configured to determine the attention position based on the line-of-sight information received from the video output device.

6. The video transmission system according to claim 1, wherein the circuitry of the video transmission device is further configured to set the first video quality and the second video quality based on network information that indicates a communication status between the video transmission device and the video output device using the network.

7. The video transmission system according to claim 1, wherein the circuitry of the video transmission device is further configured to:

divide the range included in the video recorded by the video-recording unit into the first region, the second region, and a boundary region located between the first region and the second region; and set, for the boundary region, a video quality that is lower than the first video quality and higher than the second video quality.

8. The video transmission system according to claim 1, wherein the video quality includes at least one of a sharpness of an image included in a video or a smoothness of a motion in a video.

9. The video transmission system according to claim 1, wherein setting the first video quality and the second video quality includes setting a first bit rate per unit division for the first region and setting, for the second region, a second bit rate per unit division that is lower than the first bit rate per unit division.

* * * * *